(12) United States Patent
Mogamiya et al.

(10) Patent No.: US 7,643,086 B2
(45) Date of Patent: Jan. 5, 2010

(54) ELECTRONIC STILL CAMERA HAVING A SEALING MEMBER FOR OPTICALLY ISOLATING AN IMAGE PICKUP ELEMENT

(75) Inventors: Makoto Mogamiya, Tokyo (JP); Teruo Sakai, Saitama (JP)

(73) Assignee: Hoya Corporation, Tokyo (JP)

( * ) Notice: Subject to any disclaimer, the term of this patent is extended or adjusted under 35 U.S.C. 154(b) by 687 days.

(21) Appl. No.: 10/648,313

(22) Filed: Aug. 27, 2003

(65) Prior Publication Data

US 2004/0041915 A1 Mar. 4, 2004

(30) Foreign Application Priority Data

Aug. 28, 2002 (JP) ............... 2002-248895

(51) Int. Cl.
*H04N 5/225* (2006.01)
(52) U.S. Cl. ...................... 348/374; 348/335
(58) Field of Classification Search ............... 348/374, 348/207.99, 335, 208.99, 208.7, 208.8, 208.11
See application file for complete search history.

(56) References Cited

U.S. PATENT DOCUMENTS

| 3,975,750 | A | * | 8/1976 | Yoshino et al. | 396/384 |
|---|---|---|---|---|---|
| 4,589,023 | A | * | 5/1986 | Suzuki et al. | 348/341 |
| 5,050,014 | A | * | 9/1991 | Maeda et al. | 360/75 |
| 5,315,435 | A | * | 5/1994 | Horiuchi | 359/554 |
| 6,225,244 | B1 | * | 5/2001 | Oguma | 501/45 |
| 6,374,060 | B1 | | 4/2002 | Mogamiya | |
| 6,734,894 | B1 | * | 5/2004 | Higuchi et al. | 348/69 |
| 2001/0017984 | A1 | * | 8/2001 | Kabe et al. | 396/349 |
| 2002/0036697 | A1 | * | 3/2002 | Mori et al. | 348/229 |
| 2003/0001960 | A9 | * | 1/2003 | Kato et al. | 348/342 |
| 2003/0169333 | A1 | * | 9/2003 | Yazawa et al. | 348/65 |
| 2008/0079846 | A1 | * | 4/2008 | Ikari | 348/373 |

FOREIGN PATENT DOCUMENTS

| DE | 4414318 A1 | * | 11/1994 |
|---|---|---|---|
| JP | 61-000131 | | 1/1986 |
| JP | 4-047769 | | 2/1992 |
| JP | 2001-311997 | | 11/2001 |
| JP | 2002-090842 | | 3/2002 |
| JP | 2002-122902 | | 4/2002 |
| JP | 2003270707 A | * | 9/2003 |

OTHER PUBLICATIONS

English language Abstract of JP 2001-311997.
English language Abstract of JP 2002-122902.
English language Abstract of JP 2002-090842.

* cited by examiner

*Primary Examiner*—Jason Chan
*Assistant Examiner*—Usman Khan
(74) *Attorney, Agent, or Firm*—Greenblum & Bernstein, P.L.C.

(57) ABSTRACT

An electronic still camera includes an image pickup element provided in an optically isolated space which is opened and closed by a shutter, and an image pickup optical system which makes object light incident upon the image pickup element. An image pickup light path defined between the shutter and the image pickup element is sealed by a sealing member.

20 Claims, 2 Drawing Sheets

ELECTRONIC STILL CAMERA HAVING A SEALING MEMBER FOR OPTICALLY ISOLATING AN IMAGE PICKUP ELEMENT

BACKGROUND OF THE INVENTION

1. Field of the Invention

The present invention relates to a camera having a shutter and particularly an electronic still camera having a focal-plane shutter, such as an interchangeable lens type single lens reflex camera.

2. Description of the Related Art

In an electronic still camera having a focal-plane shutter, such as a single lens reflex camera, an image pickup element (image sensor) is arranged behind the focal-plane shutter. Upon photographing, the focal-plane shutter is opened so that object light transmitted through a photographing lens (image pickup optical system) can be received by an image pickup element. FIG. 2 shows main components of a known single lens reflex camera type of electronic still camera.

The object light transmitted through a photographing lens (not shown) is reflected by a quick return mirror 13, is transmitted through a focusing screen 15 which is located in a position optically equivalent to an image forming surface position IP, is converged by a condenser lens 17, is reflected by a pentagonal prism 19, and is emitted from an eyepiece 21. A user views an erect real image of an object formed on the focusing screen 15 through the eyepiece 21, the pentagonal prism 19 and the condenser lens 17. Upon exposure, the quick return mirror 13 is moved up, and the focal-plane shutter curtain 23 is opened. The object image formed by the photographing lens (not shown) is projected onto an image pickup surface 103 of an image pickup element 101.

In such an interchangeable lens type single lens reflex camera, the image pickup element 101 is provided in an internal space of a camera body 11. However, foreign matter such as dust can enter the camera body during attachment or detachment of the lens. Therefore, there is a possibility that foreign matter sticks to a surface of an optical element which is located closer to the object (subject) than the image pickup element 101 in the light path, for example, a low-pass filter 105. If foreign matter sticks to the surface of the low-pass filter 105, a clear image of the foreign matter is projected onto the image pickup surface 103, thus resulting in deteriorated image quality.

SUMMARY OF THE INVENTION

The present invention eliminates the above-mentioned drawbacks of a single lens reflex type electronic still camera by providing an electronic still camera in which no foreign matter, such as dust, can enter a light path defined between a shutter and an image pickup element.

The present invention provides an electronic still camera in which the distance between an optical element, such as a low-pass filter or an infrared absorption filter, and an image pickup element can be increased.

According to an aspect of the present invention, an electronic still camera is provided, including an image pickup element provided in an optically isolated space which is opened and closed by a shutter, and an image pickup optical system which makes object light incident upon the image pickup element. An image pickup light path defined between the shutter and the image pickup element is sealed by a sealing member.

With this structure, there is no chance of foreign matter such as dust entering the image pickup light path behind of the shutter.

It is desirable for the sealing member to include a tubular member which surrounds a light path space defined between the shutter and the image pickup element.

It is desirable for the tubular member to be extendable and contractible in an optical axis direction of the image pickup optical system. An optical element is fitted in an opening of the tubular member on the object side to seal the tubular member.

It is desirable for the sealing member to include a tubular member which surrounds a light path space defined between the shutter and an image pickup surface of the image pickup element, wherein the tubular member is extendable and contractible in an optical axis direction of the image pickup optical system, the tubular member being closely connected, at the end thereof which defines an opening end on the object side, to a frame member, which restricts an aperture which is opened and closed by the shutter, and an optical element which seals the frame member.

It is desirable for the tubular member to be in close contact, at an end surface thereof defining the opening on the object side, with the frame member which restricts the aperture opened and closed by the shutter.

It is desirable for the optical element to be secured to the frame member.

It is desirable for the optical member to be a transparent plane-parallel plate.

It is desirable for the optical element to be constructed from at least one of a low-pass filter and an infrared absorption filter.

In another embodiment, an electronic still camera is provided, including an image pickup element provided in an optically isolated space which is opened and closed by a shutter, an image pickup optical system which makes object light incident upon the image pickup element, and a frame member which restricts an aperture which is opened and closed by the shutter, the frame member being provided with at least one of a low-pass filter and an infrared absorption filter secured thereto.

With this structure, since the distance between the image pickup element and the filter can be increased, even if foreign matter sticks to the filter, an image is less influenced by the foreign matter.

It is desirable for the low-pass filter and the infrared absorption filter to be cemented to each other.

It is desirable for the low-pass filter to be closely secured to the frame member which is located closer to the image pickup element than the shutter.

It is desirable for the infrared absorption filter to be closely secured to the frame member which is located closer to the image pickup element than the shutter.

It is desirable for the low-pass filter or the infrared absorption filter to be closely secured to the frame member which is located closer to an object than the shutter.

It is desirable for the infrared absorption filter to be closely secured to the frame member which is located closer to an object than the shutter.

The present disclosure relates to subject matter contained in Japanese Patent Application No. 2002-248895 (filed on Aug. 28, 2002) which is expressly incorporated herein by reference in its entirety.

BRIEF DESCRIPTION OF THE DRAWINGS

The invention will be discussed below with reference to the accompanying drawings in which.

DESCRIPTION OF THE PREFERRED EMBODIMENT

Figure 1:
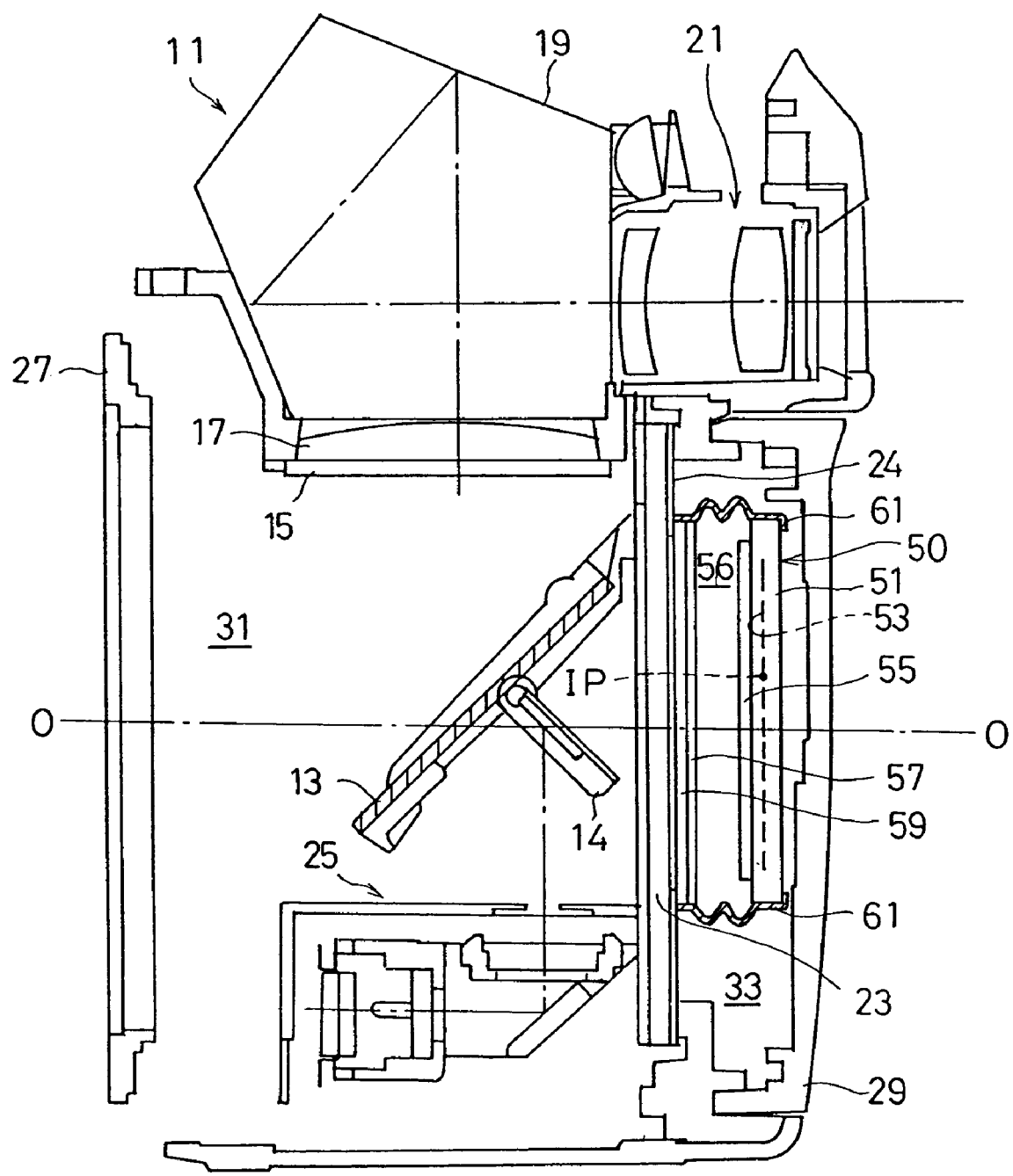
FIG. 1 is a longitudinal sectional view of main optical components in a camera body of an electronic single lens reflex camera having an image pickup element, according to an embodiment of the present invention.
Figure 2:
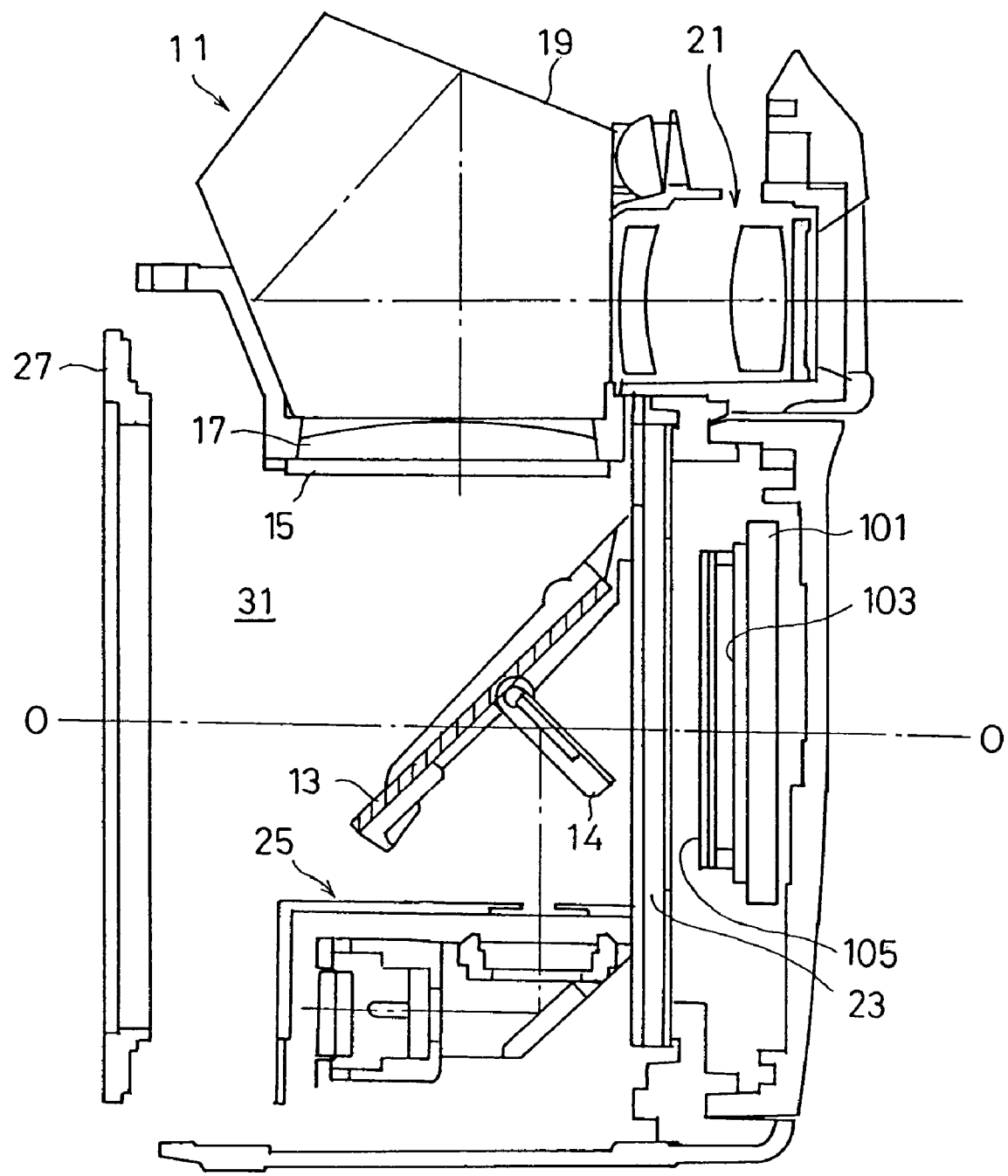
FIG. 2 is a longitudinal sectional view of main optical components in a camera body of a known electronic single lens reflex camera.

In FIG. 1 which shows a longitudinal sectional view of a main portion of an embodiment of the invention, applied to an interchangeable lens type electronic single lens reflex camera having a focal-plane shutter, a photographing lens (not shown) is detachably attached to a body mount 27 of a single lens reflex camera body 11. Object light transmitted through the photographing lens attached to the camera body is reflected by a quick return mirror 13, is transmitted through a focusing screen 15 which is located at a position optically equivalent to an image forming surface position IP, is converged by a condenser lens 17, is reflected by a pentagonal prism 19, and is emitted from an eyepiece 21. The user can view an erect real image of an object formed on the focusing screen 15 via the condenser lens 17, the pentagonal prism 19, and the eyepiece 21.

The quick return mirror 13 is provided on the central portion thereof with a half mirror portion, so that the object light transmitted through the half mirror portion is reflected by an auxiliary mirror 14 toward an AF sensor unit 25. The AF sensor unit 25 includes a pupil dividing phase-difference sensor, which is known in the art, which performs pupil-dividing of the object light of an object image formed at a position equivalent to the image forming surface position IP and forms a pair of object images on a line sensor. The line sensor converts the object images into a pair of electric object image signals (brightness distribution signals). A CPU (MPU) incorporated in the camera body 11 detects a phase difference of the pair of object images, based on a pair of object image signals supplied from the line sensor, and calculates the focus state (defocus amount) at the equivalent position (at the focusing screen 15).

A focal plane shutter curtain 23 is provided in the camera body 11 on the side slightly closer to the object side than the image forming surface position IP at which the object image is formed when the quick return mirror 13 is moved up. An image pickup element 50 is provided behind the focal plane shutter curtain 23 so that the image pickup surface 53 is located at the image forming surface position IP. The inside of the camera body 11 is divided into a mirror receiving space 31, in which the quick return mirror 13, etc., is accommodated, and an image pickup element receiving space 33 in which the image pickup element 50 is accommodated, by the focal plane shutter curtain 23 and a shutter rear frame 24 which supports the focal plane shutter curtain 23 and restricts an aperture which is opened and closed by the focal plane shutter curtain 23. The image pickup element receiving space 33 is optically isolated by the focal plane shutter curtain 23, the shutter rear frame 24, and a rear body cover 29 which forms a part of the outer shape of the camera body 11, etc., when the focal plane shutter curtain 23 is closed. The shutter rear frame 24 supports the peripheral edge portion of the focal plane shutter curtain 23 in an optically sealed state and restricts the aperture when the focal plane shutter curtain 23 is fully opened.

The basic photographing operation of the electronic single lens reflex camera is as follows.

Upon photographing, the quick return mirror 13 is moved up and the focal-plane shutter is opened, so that an object image is formed on the image pickup surface 53. The object image is converted by an optoelectric transducer and is accumulated (picked up) as electric charges. The accumulated charges are read as electric signals by the CPU (not shown) after the focal plane shutter curtain 23 is closed.

The above discussion has been directed to the basic structure of an electronic single lens reflex camera. The image pickup element 50 to which a feature of the present invention is addressed will be discussed below.

In the illustrated embodiment, the image pickup element 50 includes an image pickup element body 51 having a CCD image sensor portion which is covered by a ceramic package and a protection glass plate 55 to seal the CCD image sensor portion in the ceramic package by closing an opening of the ceramic package. The protection glass plate 55 is secured at its peripheral edge to the image pickup element body 51 by an adhesive. An IR (infrared) absorption filter 57 and an optical low-pass filter 59 adhered thereto by an optical adhesive are provided closer to the object side than the protection glass plate 55.

The optical low-pass filter 59 is larger than an aperture of the shutter rear frame 24 and is secured at the peripheral edge of the low-pass filter 59 to the surface of the shutter rear frame 24 that is located adjacent to the image pickup element 50. The shutter rear frame 24 defines, together with the optical low-pass filter 59, the mirror receiving space 31 in which the quick return mirror 13, etc., is received and the image pickup element receiving space 33 in which the image pickup element 50 is received, and isolates the image pickup element receiving space 33 from the mirror receiving space 31.

In the illustrated embodiment, the light path space 56 between the optical low-pass filter 59, the IR absorption filter 57 and the protection glass plate 55 of the image pickup element 50 is isolated by an extendable/contractible member (sealing member) 61. The extendable/contractible member 61 is rectangular in cross section to define therein the light path space 56, and is elastically extendable and contractible in the optical axis direction O, due to the elastic bellows structure thereof. The extendable/contractible member 61 is closely fitted, at a front opening thereof on the object side, to the optical low-pass filter 59 and at the rear opening thereof, to the image pickup element body 51. Since the light path space 56 defined between the optical low-pass filter 59, the IR absorption filter 57 and the protection glass plate 55 is isolated by the extendable/contractible member 61, there is no chance of foreign matter, such as dust, entering the light path space 56.

The shutter rear frame 24 can be closely fitted to the optical low-pass filter 59. Alternatively, it is possible to closely fit and secure the opening end of the extendable/contractible member 61 which surrounds the optical low-pass filter 59 to the shutter rear frame 24.

Furthermore, the extendable/contractible member 61 can have a telescopic structure which has a plurality of frame members of different sizes which are telescopically and slidably fitted to each other. It is desirable that the inner surface of the extendable/contractible member 61 be made of or coated with an anti-reflection material.

The image pickup element 50 is position-adjusted and secured to a securing portion of the camera body 11 so that the image pickup surface 53 lies in a plane perpendicularly to the optical axis O and is located at the image forming surface position IP. The adjustment of the position of the image pickup element 50 can be easily carried out due to the extendable/contractible member 61 being not only deformable in the optical axis direction O but also twistable in any direction with respect to the optical axis O.

As can be understood from the foregoing, since the optical low-pass filter 59 (which is necessary to use the image pickup element for a single lens reflex camera) is spaced from the image pickup element body 51 as distant as possible, if foreign matter sticks to the optical low-pass filter 59, there is no chance of a clear image of the foreign matter being imprinted. Moreover, since the light pass space 56 between the optical low-pass filter 59 and the image pickup element body 51 is isolated by the extendable/contractible member 61, no foreign matter sticks to the surface of the optical element located behind the optical low-pass filter 59, i.e., the protection glass plate 55.

Furthermore, the order of the arrangement of the image pickup element 50 and the filters 59 and 57, adhered and connected to the extendable/contractible member 61 is optional. With respect to assembly efficiency, it is desirable for the image pickup element 50, the optical low-pass filter 59 and the IR absorption filter 57 to be first adhered to the extendable/contractible member 61, and thereafter, the optical low-pass filter 59 be adhered to the shutter rear frame 24.

It is not always necessary to fit the image pickup element 50 and one or both of the filters 59 and 57 in the extendable/contractible member 61. For example, the optical low-pass filter 59 may be adhered to the shutter rear frame 24 and the image pickup element 50 may be secured to a securing member of the camera body through a position adjusting mechanism. In this alternative, the extendable/contractible member 61 can be fit around the ceramic package of the image pickup element 50 and the optical low-pass filter 59 or be thermally shrunk onto fitting portions provided therebetween.

Furthermore, although the optical low-pass filter 59 is brought into close contact with the rear side of the shutter rear frame 24 which is located behind the focal plane shutter curtain 23 in the illustrated embodiment, it is also possible to bring the optical low-pass filter 59 into close contact with the front side of a shutter front frame which is located in front of the focal plane shutter curtain 23 (on the object side). In this alternative, the optical low-pass filter 59, which is a front most optical member closest to the object, can be spaced farther from the image pickup surface 53. Moreover, in the present invention, the shutter is not limited to a focal plane shutter and the camera is not limited to a single lens reflex camera.

Although the optical low-pass filter 59 is located on the object side and is secured to the shutter rear frame 24 by an adhesive, in the illustrated embodiment, it is possible to replace the optical low-pass filter 59 and the IR absorption filter 57 with each other. Furthermore, the optical low-pass filter 59 and the IR absorption filter 57 can be replaced with plane-parallel optical elements, such as cover glass plates which are adhered to the shutter rear frame 24. In this alternative, the optical low-pass filter 59 and the IR absorption filter 57 are located adjacent to or adhered to the protection glass plate 55.

The optical element which is in close contact with the shutter rear frame 24 can be a concave lens or a relay lens, etc., which shift the image forming surface position IP rearwardly in the optical axis direction. The use of such an optical member increases the distance of the surface of the optical element on the object side from the image pickup surface 53, and hence, the image quality is less influenced by foreign matter which may stick to the optical element.

As can be understood from the above discussion, in an electronic still camera having an image pickup element provided in an optically isolated space which is opened and closed by a focal plane shutter, and an image pickup optical system which makes object light incident upon the image pickup element, the light path defined between the focal plane shutter and the image pickup element is sealed by a sealing member. Consequently, there is no fear that foreign matter, such as dust enters the light path in rear of the focal plane shutter.

Moreover, according to the present invention, in an electronic still camera having an image pickup element provided in an optically isolated space which is opened and closed by a focal plane shutter, and an image pickup optical system which makes object light incident upon the image pickup element, since at least one of a low-pass filter and an infrared absorption filer is secured to a fame member which restricts an aperture which is opened or closed by the focal plane shutter, the distance between the filter and the image pickup element can be increased, and hence, if foreign matter such as dust sticks to the surface of the filter on the object side, an image is less influenced by the foreign matter.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An electronic still camera comprising:
   an image pickup element provided in an optically isolated space which is opened and closed by a shutter;
   a frame member, which supports the shutter;
   an image pickup optical system which makes object light incident upon the image pickup element; and
   an elastic sealing member having a first end portion affixed to the frame member and further having a second end portion affixed to the image pickup element, and configured to seal an image pickup light path extending from the shutter to the image pickup element, wherein the elastic sealing member is positioned behind a quick return mirror.

2. The electronic still camera according to claim 1, wherein said sealing member comprises a tubular member which surrounds a light path space extending from the shutter to the image pickup element.

3. The electronic still camera according to claim 2, wherein said tubular member is configured to be extendable and contractible in an optical axis direction of the image pickup optical system; and
   wherein an optical element is fitted in an opening of said tubular member on an object side to seal the tubular member.

4. The electronic still camera according to claim 1, wherein said sealing member comprises a tubular member which surrounds a light path space extending from the shutter to an image pickup surface of the image pickup element, wherein said tubular member is extendable and contractible in an optical axis direction of the image pickup optical system, said tubular member being closely connected, at the end thereof which defines an opening end on the object side, to the frame member, which restricts an aperture which is opened and closed by the shutter, and an optical element which seals the frame member.

5. The electronic still camera according to claim 3, wherein said tubular member is in close contact, at an end surface thereof defining the opening on the object side, with the frame member which restricts the aperture opened and closed by the shutter.

6. The electronic still camera according to claim 3, wherein said optical element is secured to the frame member.

7. The electronic still camera according to claim 3, wherein said optical member is a transparent plane-parallel plate.

8. The electronic still camera according to claim 3, wherein said optical element comprises at least one of a low-pass filter and an infrared absorption filter.

9. The electronic still camera according to claim 1, further comprising an optical filter fitted in an opening at an object side of said sealing member.

10. An electronic still camera comprising:
an image pickup element provided in an optically isolated space which is opened and closed by a shutter;
an image pickup optical system configured to make object light incident upon the image pickup element; and
a frame member configured to restrict an aperture which is opened and closed by the shutter, said frame member being provided with at least one of a low-pass filter and an infrared absorption filter secured thereto; and
an elastic tubular sealing member surrounding a light path space extending from the shutter to the image pickup element, said tubular sealing member comprising:
a first end portion affixed to the frame member; and
a second end portion affixed to the image pickup element, wherein:
said tubular sealing member is configured to seal an image pickup light path extending from the shutter to the image pickup element,
said tubular sealing member is positioned behind a quick return mirror, and
the at least one of the low-pass filter and the infrared absorption filter is sealed by the sealing member.

11. The electronic still camera according to claim 10, wherein said low-pass filter and the infrared absorption filter are cemented to each other.

12. The electronic still camera according to claim 10, wherein said low-pass filter is closely secured to the frame member which is located closer to the image pickup element than the shutter.

13. The electronic still camera according to claim 10, wherein said infrared absorption filter is secured to the frame member, the frame member which is located closer to the image pickup element than the shutter.

14. The electronic still camera according to claim 10, wherein one of said low-pass filter and said infrared absorption filter is secured to the frame member, the frame member which is located closer to an object than the shutter.

15. The electronic still camera according to claim 10, wherein said infrared absorption filter is secured to the frame member, is the frame member which is located closer to an object than the shutter.

16. The electronic still camera according to claim 10, wherein said frame member is provided at an object side of the optically isolated space.

17. The electronic still camera according to claim 10, wherein said frame member supports the shutter.

18. The electronic still camera according to claim 1, wherein said sealing member is generally bellows shaped.

19. The electronic still camera according to claim 10, wherein said sealing member is generally bellows shaped.

20. The electronic still camera according to claim 10, wherein the shutter is mounted on the frame member.

* * * * *